May 30, 1950 M. SOSS 2,509,993
CONVERTIBLE AUTOMOTIVE MOWER
Filed Aug. 5, 1947 2 Sheets-Sheet 1

Inventor
Mark Soss
Attorney

May 30, 1950     M. SOSS     2,509,993
CONVERTIBLE AUTOMOTIVE MOWER
Filed Aug. 5, 1947     2 Sheets-Sheet 2
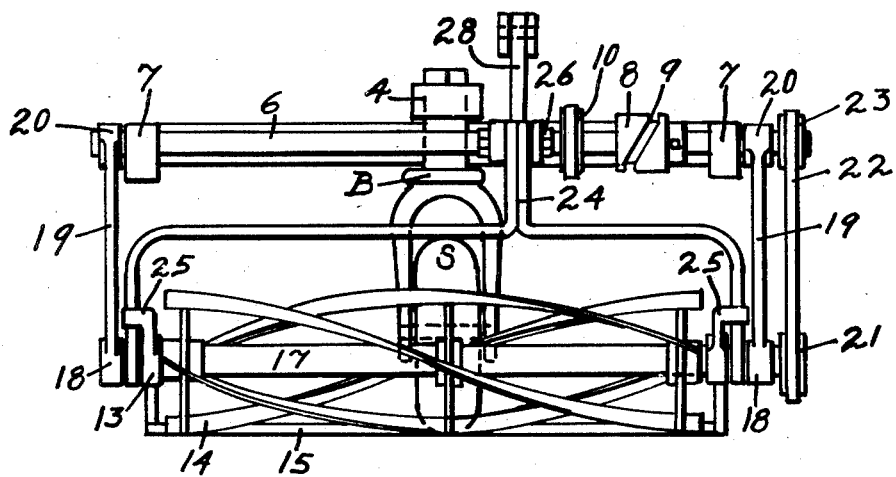
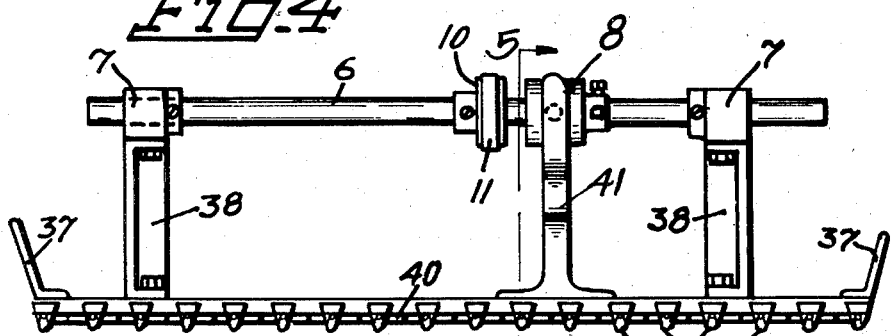
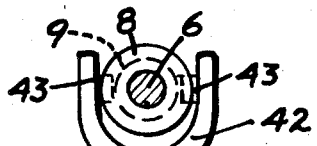
Inventor
Mark Soss Patented May 30, 1950

2,509,993

UNITED STATES PATENT OFFICE 2,509,993

CONVERTIBLE AUTOMOTIVE MOWER

Mark Soss, Spokane, Wash.

Application August 5, 1947, Serial No. 766,222

1 Claim. (Cl. 56—26)

My present invention relates to the general class of harvesters, and more specifically to improvements in a convertible automotive mower of the three-wheel type that is adapted for light farm work as well as for domestic work as on large estates, and the wheeled implement includes mechanism for operating selectively an interchangeable rotary cutting reel of the spiral blade type, and a reciprocating cutter of the sickle type, that may with facility be employed as front cutters for the implement.

The automotive vehicle or tractor, of the riding type, is equipped with a manually controlled front steering wheel and a pair of motor operated traction wheels, together with a front power output shaft and motor operated driving means, and transmission mechanism from the power output shaft to the selected cutting mechanism. Manually operated means are also employed for simultaneously adjusting the cutting mechanism in a vertical plane and for controlling the driving mechanism of the power output shaft to facilitate the operation and control of the implement as well as the cutting mechanism.

The invention consists in certain novel combinations and arrangements of parts as will hereinafter be described and more particularly set forth in the appended claim.

In the accompanying drawings I have illustrated a complete example of a physical embodiment of my invention including an interchangeable rotary cutter and a reciprocating cutter, in which the parts are combined and arranged in accord with one mode I have devised for the practical application of the principles of my invention. It will however be understood that changes and alterations are contemplated and may be made in these exemplifying drawings and mechanical structures, within the scope of my claim, without departing from the principles of the invention.

Figure 3 is a front elevation showing the vertically adjustable rotary cutter, a power output shaft and transmission mechanism between the shaft and cutter.

Figure 4 is a view in front elevation showing the vertically adjustable reciprocating cutter and the power transmission mechanism between the power shaft and this interchangeable cutter; and Figure 5 is a vertical sectional detail view at line 5—5 of Fig. 4.

In order that the general arrangement and utility of parts may readily be understood I have disclosed a conventional tractor including a main frame I having a front cross frame made up of spaced bearing arms 2, 2, and the frame is supported on two traction wheels W driven from a motor M through a double belt drive D, under control of lever L of transmission gearing contained in the transmission case T. The motor is controlled by suitable mechanism as indicated at C, and power from the motor is transmitted to the wheels W through the usual axle A for propelling the implement.

A single centrally located steering wheel S is mounted below the frame by a forked swivel bearing B, and a manually operated steering lever 4 for the wheel is located in position for ready access by the driver who occupies the usual seat 5 mounted on the main frame.

Figure 1:
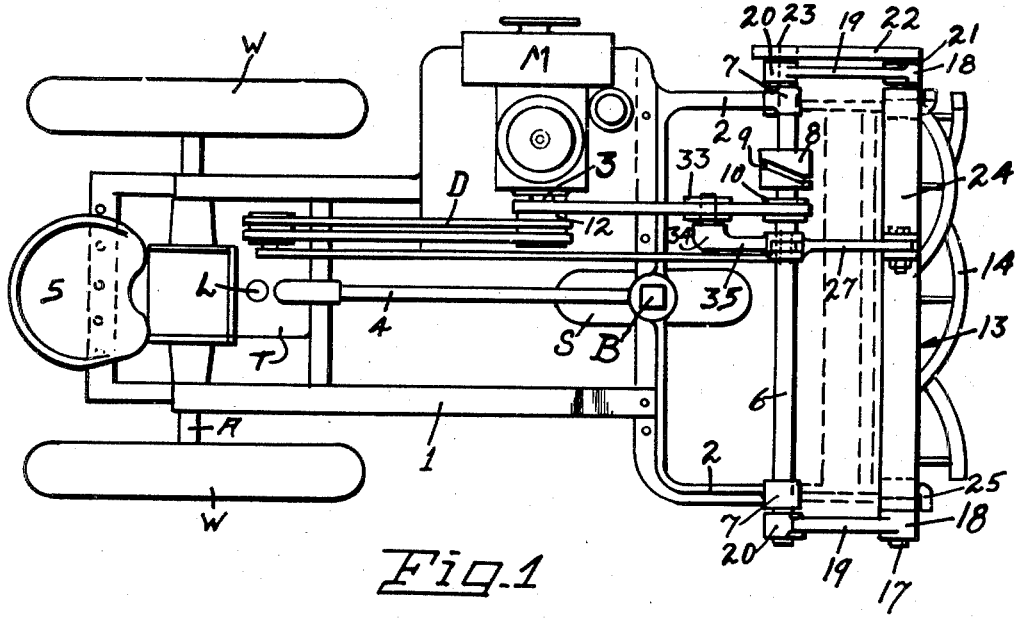
Figure 1 is a plain view of a tractor in which my invention is embodied and equipped with a front rotary cutter.
Figure 2:
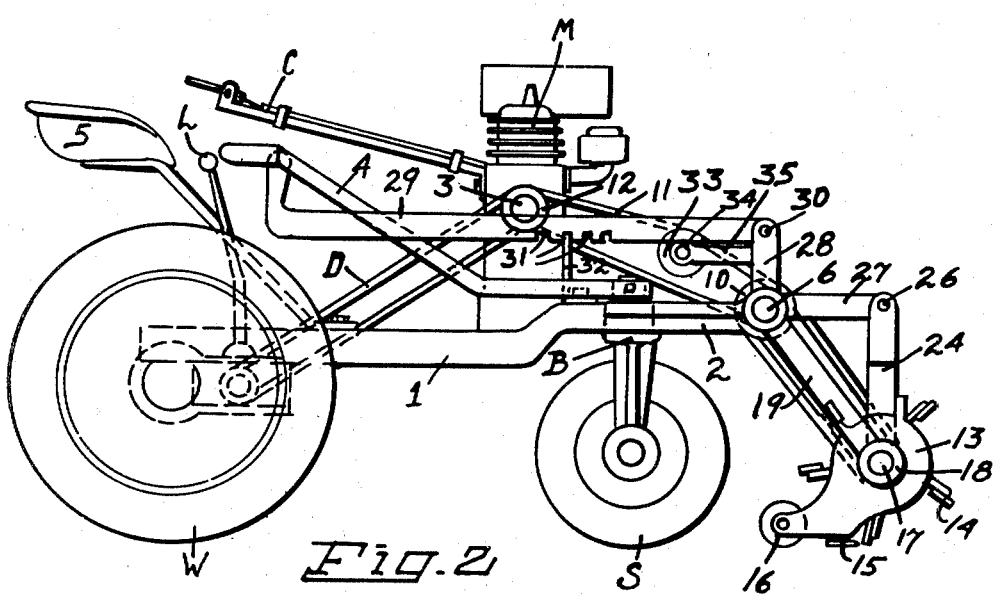
Figure 2 is a view in side elevation of the automotive implement of Fig. 1.

At the front of the implement a transversely arranged power output shaft 6, is journaled in bearing 7 of the arms 2, 2 of the main frame which is provided with interchangeable mechanism for converting the implement for use with a rotary cutter as in Figs. 1, 2, and 3, and for use in translating the rotary movement of the output shaft into reciprocating movement of a reciprocating cutter of the sickle type as in Figs. 4 and 5.

For use in transmitting power to the reciprocating cutter the shaft is equipped with a rotary cam head 8 having an exterior cam groove 9 in its outer periphery, and for transmitting power to the selected rotary cutter the shaft is provided with additional transmitting mechanism to be described.

The power output shaft is driven from the motor M through a belt drive including a driven pulley 10 on the power shaft, a belt 11, and a driving pulley 12 on the motor shaft 3; and in Figs. 1, 2, and 3 a conventional type of lawn mower 13 is illustrated with usual spiral blades 14 and fixed cutter bar 15, and this rotary cutter is journaled by its shaft 17 in bearings 18 of two spaced bearing arms 19.

The rotary cutter is located in front of and below the output shaft and supported on rollers as 16, and the bearing arms 19 are hinged at 20 on the power output shaft so that they project downwardly and forwardly from the output shaft to permit a swinging movement, vertically, of the arms and the mower. By this swinging movement the cutter mechanism may be adjusted vertically to vary the depth of the cut, and the cutter mechanism may be elevated to inoperative position for transportation and other purposes.

For transmitting rotary power and motion from the power shaft to the rotary cutter a driven pulley 21 is mounted on the cutter shaft 17, and a belt 22 passes from the driven pulley to a drive pulley 23 on the power output shaft 6.

For raising and lowering, or vertically adjusting the cutting mechanims of either type illustrated in the drawings, a suspension frame in the form of a yoke 24 is provided with its ends journaled on the cutter unit, and retaining lugs 25 on the cutter unit co-act with the rollers or wheels 16 to retain the cutter in operative position.

The frame 24 and its pivotally suspended cutting mechanism are suspended at 26 on a horizontal arm 27 of a bell crank 28, which is journaled on the power output shaft 6, and an operating lever 29, located in position for ready access to the driver who occupies the seat 5, is pivoted at 30 to the bell-crank. By pushing and pulling on the operating lever the bell-crank may be rocked for vertically adjusting the cutting mechanism, and the cutting mechanism may be retained in adjusted position by co-action of a selected notch in a series of notches 31 of the lever and a fixed abutment or lug 32 rigid with the main frame.

The movement of the operating lever and the bell-crank are also utilized in controlling the transmission of power through the driving belt 11 to the power output shaft 6, and for this purpose a shifting roller or idler 33 is journaled in a bearing bracket 34 of an arm 35 that is mounted rigidly on the bell-crank. By a forward push of the operating lever the cutting mechanism is depressed to operative position, and simultaneously the roller 33 is pushed into contact with the belt 11 to tighten the belt on its pulleys 12 and 10 for rotating the shaft 6; and by a rearward pull on the operating lever the cutting mechanism may be vertically adjusted, and the belt tightener may be released.

In Figs. 4 and 5 a reciprocating cutter is shown for interchangeable use with the implement, which cutter includes the stationary teeth 36 and suspension arms 37 together with the reciprocating toothed cutter bar 40.

The reciprocating cutter mechanism is hinged on the power output shaft by means of two spaced hinge arms 38, bolted to the cutter at their lower ends and at their upper ends these arms are hinged on the shaft by means of bearings 7 to which the arms are also bolted.

The power output shaft 6 is rotated by the power transmission mechanism including the driven pulley 10 and belt 11, and the rotary motion and power of the shaft 6 is translated into reciprocating movement of the sickle type of cutter through an actuating arm 41 that is rigidly mounted at its lower end on the reciprocating cutter. The upper end of this actuating arm terminates in a U-shape yoke or fork 42 that is provided with spaced and alined pins or trunnions 43 located in the peripheral cam groove 9 of the rotary cam head 8.

From this description it will be apparent that the implement may be converted from a rotary cutting implement to a reciprocating cutting implement by removing the rotary cutter and substituting the reciprocating cutter; and the suspension frame 24 with its operating mechanism mounted on the power output shaft, together with the belt tightener, are utilized for manipulating the interchanged parts.

Having thus fully described my invention, what I claim as new and desire to secure by Letters Patent is:

In an automotive implement having a supporting frame, a transversely extending rotary power output shaft journaled therein, and driving means for the shaft, of a pair of spaced arms hinged on the shaft, a vertically adjustable cutting mechanism mounted in the arms, a suspending frame pivotally supporting the cutting mechanism, manually operated means for raising and lowering the frame and means for retaining the frame in adjusted position, and means coacting with the driving means and the manually operated means for controlling the former and adjusting the latter.

MARK SOSS.

REFERENCES CITED

The following references are of record in the file of this patent:

UNITED STATES PATENTS

| Number | Name | Date |
|---|---|---|
| 1,012,521 | Coldwell | Dec. 19, 1911 |
| 2,299,859 | Speiser | Oct. 27, 1942 |
| 2,368,290 | Donald | Jan. 30, 1945 |